(12) United States Patent
Kaneko

(10) Patent No.: US 11,143,262 B2
(45) Date of Patent: Oct. 12, 2021

(54) ROTARY DAMPER

(71) Applicant: OILES CORPORATION, Tokyo (JP)

(72) Inventor: Ryohei Kaneko, Fujisawa (JP)

(73) Assignee: OILES CORPORATION, Tokyo (JP)

(*) Notice: Subject to any disclaimer, the term of this patent is extended or adjusted under 35 U.S.C. 154(b) by 80 days.

(21) Appl. No.: 16/491,040

(22) PCT Filed: Mar. 12, 2018

(86) PCT No.: PCT/JP2018/009557
§ 371 (c)(1),
(2) Date: Sep. 4, 2019

(87) PCT Pub. No.: WO2018/168788
PCT Pub. Date: Sep. 20, 2018

(65) Prior Publication Data
US 2020/0018374 A1    Jan. 16, 2020

(30) Foreign Application Priority Data
Mar. 15, 2017  (JP) .............................. JP2017-050362

(51) Int. Cl.
*F16F 9/14* (2006.01)
*B60N 2/02* (2006.01)
(Continued)

(52) U.S. Cl.
CPC .................. *F16F 9/14* (2013.01); *F16F 9/34* (2013.01); *B60G 2202/22* (2013.01);
(Continued)

(58) Field of Classification Search
CPC ........ F16F 9/14; F16F 9/34; F16F 9/44; F16F 9/145; F16F 9/346; B60N 2/028; B60N 2/20; B60N 2/02
(Continued)

(56) References Cited

U.S. PATENT DOCUMENTS 1,932,770 A * 10/1933 Crowe .................... F16F 9/145
                                                    188/310
4,926,984 A *  5/1990 Pollitt .................... F16F 9/145
                                                    188/306
(Continued)

FOREIGN PATENT DOCUMENTS

CN    102840264    12/2012
CN    203693466     7/2014
(Continued)

OTHER PUBLICATIONS

International Search Report for PCT/JP2018/009557, dated May 15, 2018, 2 pages.
(Continued)

*Primary Examiner* — Christopher P Schwartz
(74) *Attorney, Agent, or Firm* — Nixon & Vanderhye P.C.

(57) ABSTRACT

Provided is a rotary damper on which the timing for generating a damping torque can be set freely. Groove-like bypass passages (805) that are longer in the circumferential direction than vanes (501) are formed in the upper surface (803) of a torque regulation plate (8) arranged on the bottom part (201) of a cylindrical circular chamber (200). When the rotor (5) rotates in a first rotational direction R1, if both end faces (508a, 508b) of the vanes (501) are positioned within a range of the respective bypass passages (805), each area (218) and the corresponding area (217) are communicated via the corresponding bypass passage (805), enabling movement of a viscous fluid (6) from the area (217) to the area (218). Subsequently, if the rotor (5) rotates further in the first rotational direction R1 and one or both of the end faces (508a, 508b) of each vane (501) is outside of the range of the corresponding bypass passage (805), each area (218) and the corresponding area (217) are not communicated via the corresponding bypass passage (805), and the viscous fluid (Continued)

(6) is unable to move from each area (217) to the corresponding area (218).

26 Claims, 11 Drawing Sheets

(51) Int. Cl.
*F16F 9/34* (2006.01)
*F16F 9/44* (2006.01)
*F16F 9/48* (2006.01)

(52) U.S. Cl.
CPC ........... *E05Y 2201/256* (2013.01); *F16F 9/44* (2013.01); *F16F 9/48* (2013.01)

(58) Field of Classification Search
USPC ................ 188/290–296, 306–310; 16/52, 54
See application file for complete search history.

(56) References Cited

U.S. PATENT DOCUMENTS

| | | | | | |
|---|---|---|---|---|---|
| 6,154,924 | A | * | 12/2000 | Woo | E05F 3/14 |
| | | | | | 16/62 |
| 7,828,127 | B2 | * | 11/2010 | Jeffries | F16F 9/145 |
| | | | | | 188/307 |
| 10,823,247 | B2 | * | 11/2020 | Kaneko | F16F 9/145 |
| 10,844,925 | B2 | * | 11/2020 | Kaneko | F16F 9/14 |
| 10,875,423 | B2 | * | 12/2020 | Lohken | F16F 9/3465 |
| 2008/0105506 | A1 | * | 5/2008 | Norman | B62K 21/08 |
| | | | | | 188/310 |

FOREIGN PATENT DOCUMENTS

| | | |
|---|---|---|
| GB | 1 148 384 | 4/1969 |
| JP | H05-26277 | 2/1993 |
| JP | H07-119781 | 5/1995 |
| JP | 7-301272 | 11/1995 |
| JP | 11-210802 | 8/1999 |
| JP | 2000-120748 | 4/2000 |
| JP | 3808122 | 8/2006 |

OTHER PUBLICATIONS

Office Action with search report issued in counterpart CN App. No. 201880015531.4 (dated Nov. 27, 2020) with translation, 5 pages.
Extended European Search Report for Application No. 18766835.5 (dated Oct. 28, 2020), 8 pages.

* cited by examiner

Fig. 3
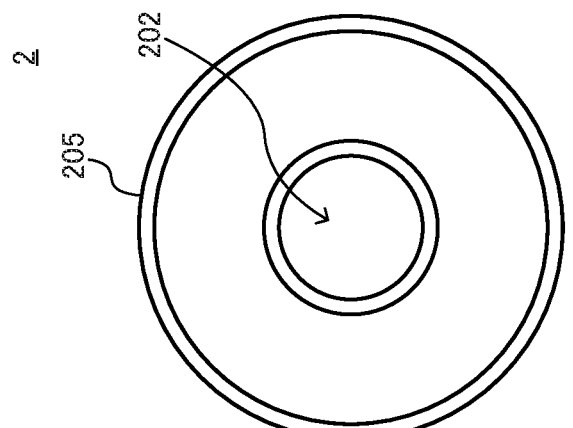
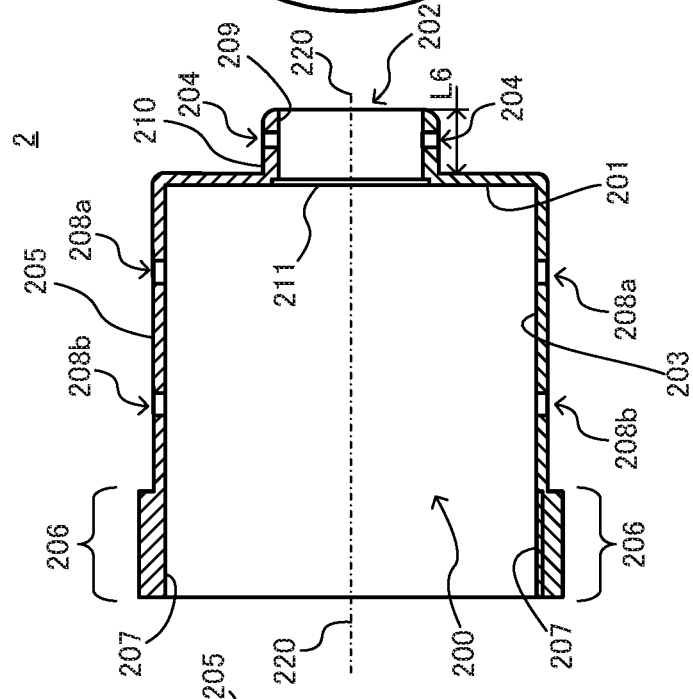
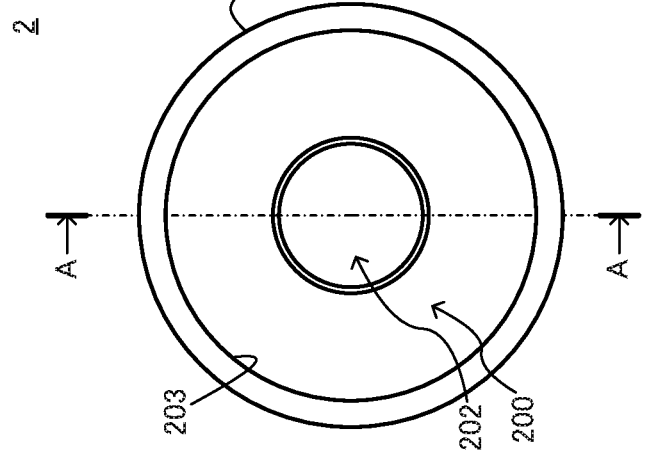

ROTARY DAMPER

This application is the U.S. national phase of International Application No. PCT/JP2018/009557 filed 12 Mar. 2018, which designated the U.S. and claims priority to JP Patent Application No. 2017-050362 filed 15 Mar. 2017, the entire contents of each of which are hereby incorporated by reference.

TECHNICAL FIELD

The present invention relates to a rotary damper, and in particular relates to a rotary damper with settable timing for generation of a damping torque.

BACKGROUND ART

A known damper generates a damping torque in reaction to applied rotating force. For example, the Patent Literature 1 discloses so-called uni-directional rotary damper capable of generating a large damping torque in relation to a rotation in a forward direction, whereas a small damping torque in relation to a rotation in a backward direction.

The rotary damper described in the Patent Literature 1 includes a casing having a circular cylindrical chamber, a rotor rotatably contained in the circular cylindrical chamber, viscous fluid filled in the circular cylindrical chamber, and a lid attached to an opening end of the casing for sealing the rotor along with the viscous fluid in the circular cylindrical chamber.

The rotor includes a rotor body of a substantial cylindrical shape, and vanes each formed projecting radially outward from an outer peripheral surface of the rotor body and generating a narrow gap between an inner peripheral surface of the circular cylindrical chamber and the vane itself. A flow path is formed on each of the vanes so as to pass through surfaces, at both ends in a rotational direction of the rotor, of the corresponding vane. A sealing member is attached to a surface, at an end in a radial direction of the rotor, of each vane (i.e. a surface facing the inner peripheral surface of the circular cylindrical chamber) to fill the narrow gap between the surface and the inner peripheral surface of the circular cylindrical chamber. Each of these sealing members has a check valve made of elastic material for opening and closing the flow path formed on the corresponding vane. The inner peripheral surface of the circular cylindrical chamber is provided with partitions protruding radially inwardly such that a narrow gap is generated between each partition and the outer peripheral surface of the rotor body.

For the structure as described above, in the rotary damper described in the Patent Literature 1, when a force is applied to the rotor to cause the rotor to rotate in a direction from one surface (hereinafter referred to as "first end surface") toward another surface (hereinafter referred to as "second end surface") out of the surfaces, at both ends in the rotational direction of the rotor, of each vane, namely in the forward direction, the viscous fluid in the circular cylindrical chamber presses each check valve against the second end surface of the corresponding vane to close and thus the check valve closes the corresponding flow path. This restricts movement of the viscous fluid to way only through the gap between each partition of the circular cylindrical chamber and the outer peripheral surface of the rotor body and a gap between a closed end surface (i.e. a bottom surface) of the casing and a lower surface of each vane (i.e. a surface facing the closed end surface of the casing), thereby increasing a pressure on the viscous fluid on the second end surface side of the vane. This results in generating a large damping torque with the start of rotating the rotor in the forward direction. When a force, conversely, is applied to the rotor to cause the rotor to rotate in a direction from the second end surface toward the first end surface of each vane (i.e. the backward direction), the viscous fluid on the first end surface side of each vane flows into the corresponding flow path to push up the corresponding check valve and to open the flow path. This allows the viscous fluid to moves also through the flow path formed in each vane, thus not increasing the pressure on the viscous fluid on the first end surface side of the vane. This results in generating a small damping torque with the start of rotating the rotor in the backward direction.

CITATION LIST

Patent Literature

Patent Literature 1: Japanese Unexamined Patent Application Laid-Open No. H07-301272

SUMMARY OF INVENTION

Technical Problem

For the rotary damper described in the Patent Literature 1, application of the rotating force in the forward direction to the rotor causes each check valve to block the corresponding flow path immediately, thereby generating the large damping torque. However, some uses of the rotary damper may intend not to generate the large damping torque immediately after application of the rotating force in the forward direction to the rotor, but to delay timing of generating the large damping torque.

The present invention has been made in view of the above situation, and an object of the present invention is to provide a rotary damper with settable timing for generation of a damping torque.

Solution to Problem

In response to the above issue, according to the present invention, a bypass passage is formed on one or both of a bottom side or an inner peripheral surface side of circular cylindrical chamber and/or on a lower side of a lid, and includes a groove longer than a thickness of a vane in a rotational direction of a rotor. When surfaces, at both ends in the rotational direction of the rotor, of the vane are located inside of a range of the bypass passage, areas upstream and downstream from the vane against the rotational direction of the rotor are communicated with each other through the bypass passage, and therefore this results in the viscous fluid in these areas becoming movable through the bypass passage; conversely, when at least one of the surfaces, at both ends in the rotational direction of the rotor, of the vane is located outside of the range of the bypass passage, the bypass passage provides no communication between the areas upstream and downstream from the vane against the rotational direction of the rotor, and therefore this results in the viscous fluid in these areas becoming immovable through the bypass passage.

For example, the present invention provides a rotary damper for limiting a movement of a viscous fluid to generate a damping torque in reaction to a rotating force applied. The rotary damper includes the followings:

a casing having a circular cylindrical chamber filled by the viscous fluid;

a partition in a shape of substantial open fan, placed in the circular cylindrical chamber and partitioning an inside of the circular cylindrical chamber;

a rotor having a rotor body and a vane, the rotor body contained in the circular cylindrical chamber rotatably relative to the circular cylindrical chamber and placing an outer peripheral surface close to an inner peripheral surface of the partition, the vane formed along a center line of the circular cylindrical chamber and radially outwardly from the outer peripheral surface of the rotor body to place a front end face close to an inner peripheral surface of the circular cylindrical chamber;

a lid attached to an opening section of the circular cylindrical chamber and sealing the rotor along with the viscous fluid within the circular cylindrical chamber; and a bypass passage having a groove longer than a thickness of the vane in a rotational direction of the rotor, the groove being located on one or both of a bottom side or an inner peripheral surface side of the circular cylindrical chamber and/or on a lower side of the lid;

upon faces that form both ends of the vane in the rotational direction of the rotor being located inside of a range of the bypass passage, an area upstream and an area downstream from the vane against the rotational direction of the rotor being communicated with each other through the bypass passage, out of the areas in the circular cylindrical chamber partitioned by the vane and the partition, and the viscous fluid in the area upstream and in the area downstream becoming movable through the bypass passage; and upon at least one of the faces that form the both ends of the vane in the rotational direction of the rotor being located outside of the range of the bypass passage, the bypass passage providing no communication between the area upstream and the downstream from the vane and the viscous fluid in the area upstream and in the area downstream becoming immovable through the bypass passage.

Advantageous Effects of Invention

In the present invention, the bypass passage including the groove longer than the thickness of the vane in the rotational direction of the rotor, is located on one or both of the bottom side or the inner peripheral surface side of the circular cylindrical chamber and/or on the lower side of the lid; while the surfaces at both end of the vane in the rotational direction of the rotor are located inside the bypass passage, the area upstream and the area downstream from the vane against the rotational direction of the rotor are communicated to each other through the bypass passage and the viscous fluid in these area upstream and the area downstream become movable through the bypass passage, resulting in generation of no large damping torque in relation to a rotating force on the rotor. Conversely, while at least one of the surfaces forming both ends of the vane in the rotational direction of the rotor are located outside the bypass passage, the bypass passage provides no communication between the areas upstream and downstream from the vane against the rotational direction of the rotor and the viscous fluid in these areas becomes immovable through the bypass passage, resulting in generation of a large damping torque in relation to a rotating force on the rotor. Consequently, changing a length and a position of the groove included in the bypass passage allows for optional setting a timing when a damping torque generates in relation to a rotating force on the rotor.

BRIEF DESCRIPTION OF DRAWINGS

FIG. 3(A) is a front view of a casing 2, FIG. 3(B) is an A-A cross sectional view of the casing 2 illustrated in FIG. 3(A), and FIG. 3(C) is a back view of the casing 2.

DESCRIPTION OF EMBODIMENTS

Figure 1:
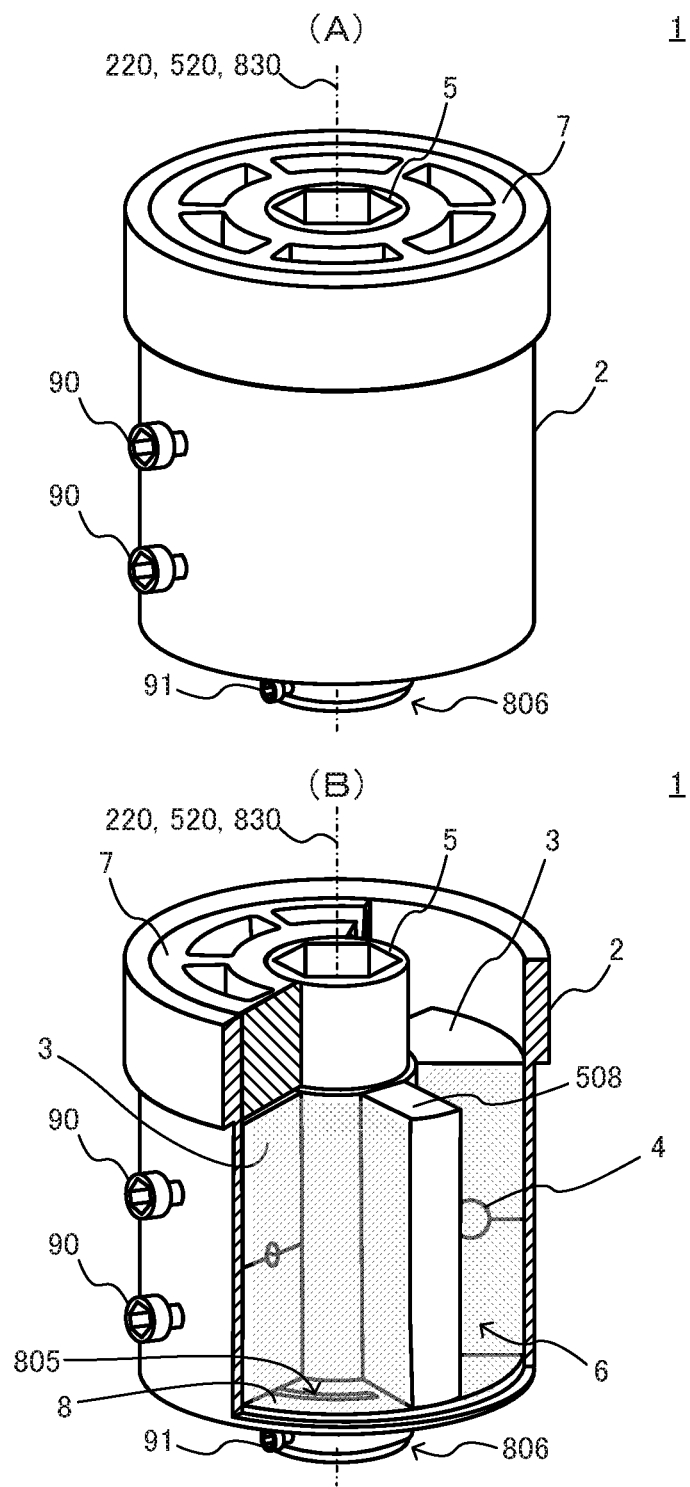
FIG. 1(A) and FIG. 1(B) are respectively an external view and a partial cross sectional view, each illustrating a schematic configuration of a rotary damper 1 according to one embodiment of the present invention.

In the following, one embodiment of the present invention will be described with reference to the drawings.

FIG. 1(A) and FIG. 1(B) are respectively an external view and a partial cross sectional view, each illustrating a schematic configuration of a rotary damper 1 according to the present embodiment. FIG. 2 is an illustrated parts breakdown of the rotary damper 1 according to the present embodiment.

As illustrated in the figures, the rotary damper 1 according to the present embodiment includes a casing 2; a pair of partitions 3; a pair of check valves 4; a rotor 5; viscous fluid 6 filled in the casing 2, such as oil and silicone; a lid 7; and a torque regulation plate 8.

The casing 2 contains the pair of the partitions 3 to each of which the check valve 4 is attached, the rotor 5, and the torque regulation plate 8, along with the viscous fluid 6.

FIG. 3(A) is a front view of the casing 2, FIG. 3(B) is an A-A cross sectional view of the casing 2 illustrated in FIG. 3(A), and FIG. 3(C) is a back view of the casing 2.

As illustrated in the figures, a circular cylindrical chamber 200 with one end opened (i.e. a space having a circular cylinder shape with a bottom) is formed inside of the casing 2, and insertion holes 208a, 208b passing through an inner peripheral surface 203 and an outer peripheral surface 205 are formed on this circular cylindrical chamber 200 for each partition 3 to be contained in the circular cylindrical chamber 200. Fixation bolts 90 inserted into the respective insertion holes 208a, 208b fixate the partitions 3 to the inside of the circular cylindrical chamber 200.

Figure 8:
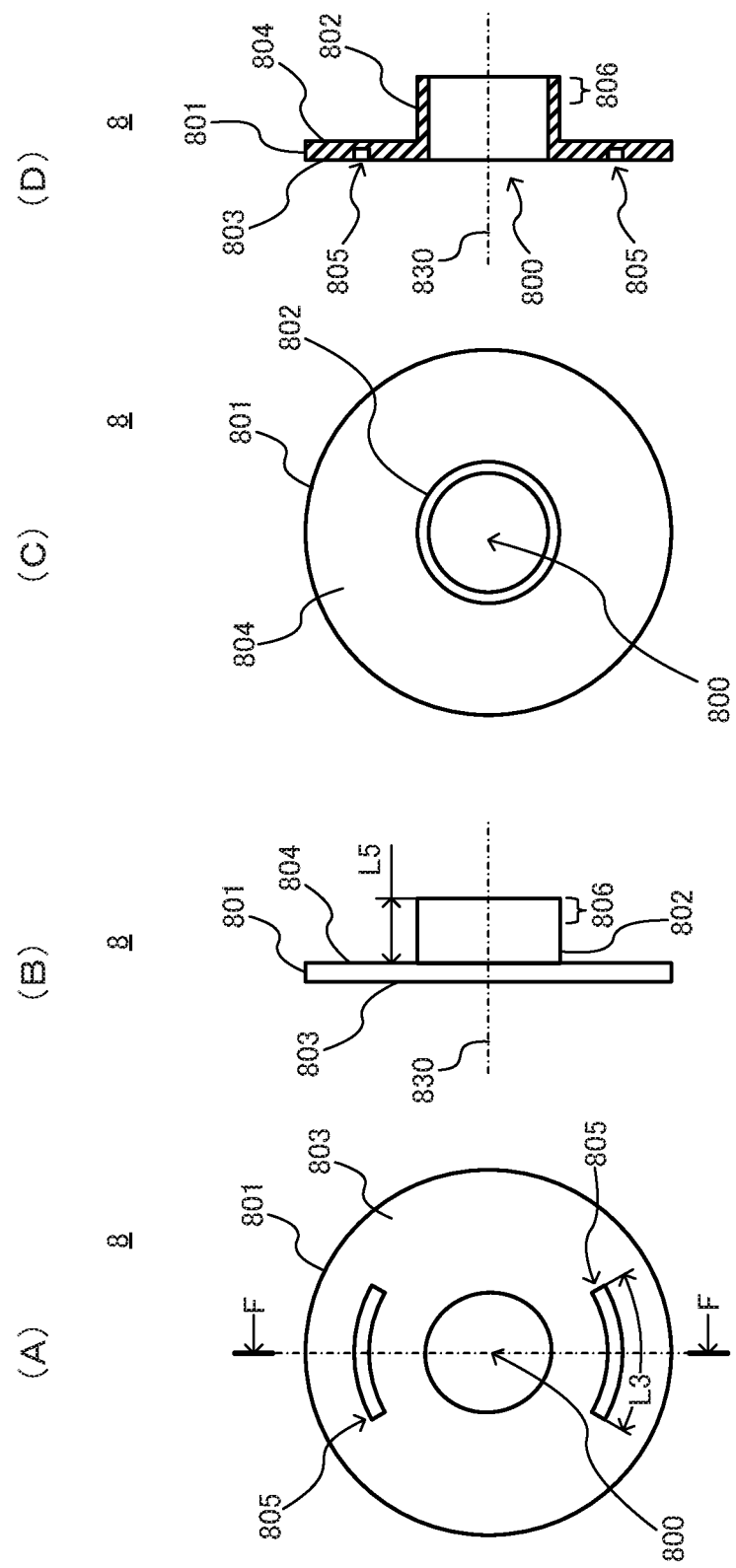
FIG. 8(A) to FIG. 8(C) are respectively a front view, a side view, and a back view, of a torque regulation plate 8.
FIG. 8(D) is an F-F cross sectional view of the torque regulation plate 8 illustrated in FIG. 8(A).

An opening part 202 of a hollow cylindrical shape is formed on a bottom part 201 of the circular cylindrical chamber 200 axially outwardly from this bottom part 201. When a insertion of an operation part 802 as described below (See FIG. 8) into this opening part 202, the torque regulation plate 8 is contained in the circular cylindrical chamber 200 (See FIG. 1 and FIG. 2) such that a center line 830 of the torque regulation plate 8 aligns with a center line 220 of the circular cylindrical chamber 200 and such that torque regulation plate 8 is capable of rotating relative to the casing 2. A pair of threaded holes 204 is formed on the opening part 202 so as to pass through an inner peripheral surface 209 and an outer peripheral surface 210. A limit screws 91 held fixed to the respective threaded holes 204 restrict rotation of the torque regulation plate 8 relative to the casing 2.

An installation part 211 for installation of a sealing member, including an O-ring, is formed at a joint part between the bottom part 201 of the circular cylindrical chamber 200 and the opening part 202 (i.e. at an inner axial-end part of the opening part 202), and the sealing member is to fill a gap between the inner peripheral surface 209 of the opening part 202 and the operation part 802 of the torque regulation plate 8 so as to prevent the viscous fluid 6 in the circular cylindrical chamber 200 from leaking out.

Figure 7:
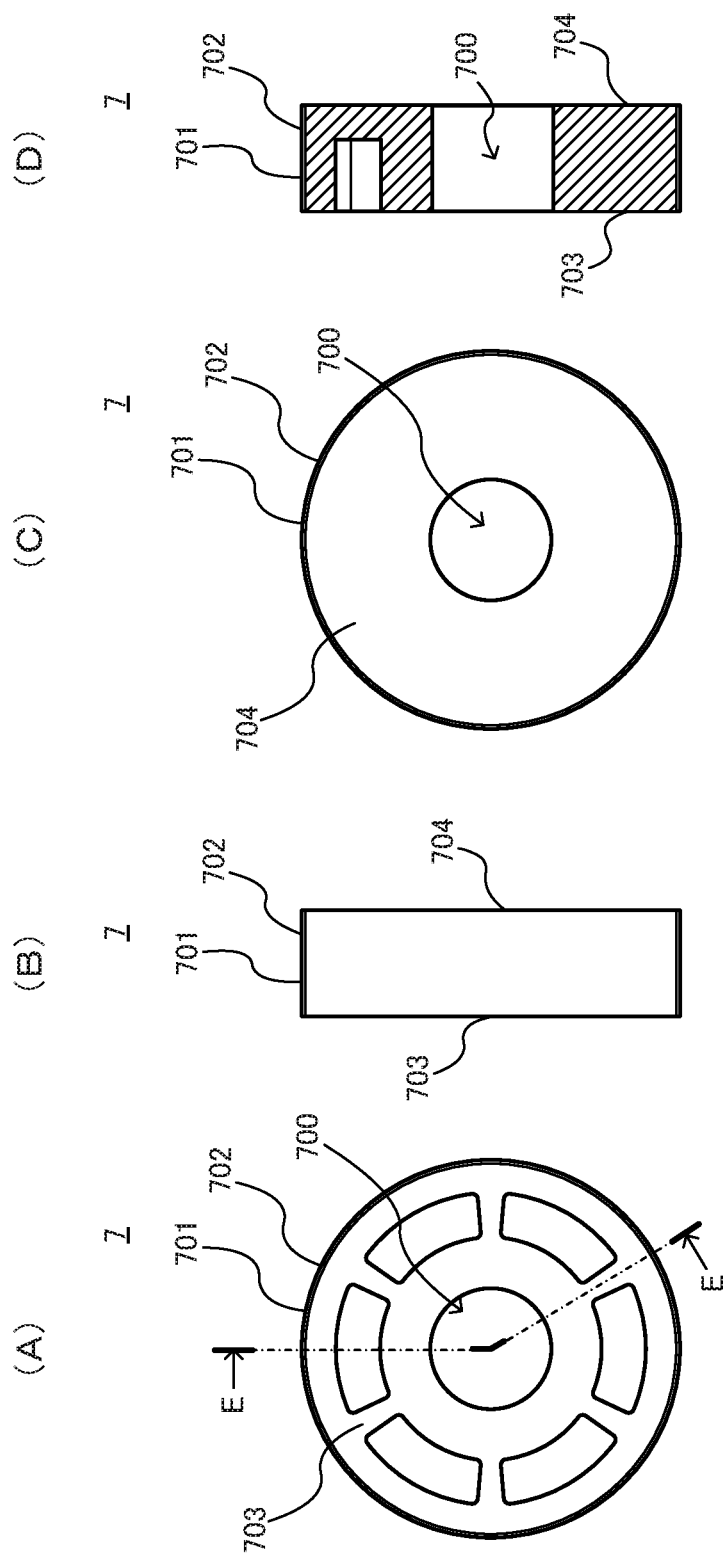
FIG. 7(A) to FIG. 7(C) are respectively a front view, a side view, and a back view, of a lid 7.
FIG. 7(D) is an E-E cross sectional view of the lid 7 illustrated in FIG. 7(A).

An internal threaded section 207 is formed in an opening side 206 of the inner peripheral surface 203 of the circular cylindrical chamber 200 so as to be screwed onto a described-below external threaded section 702 (See FIG. 7) of the lid 7.

Figure 6:
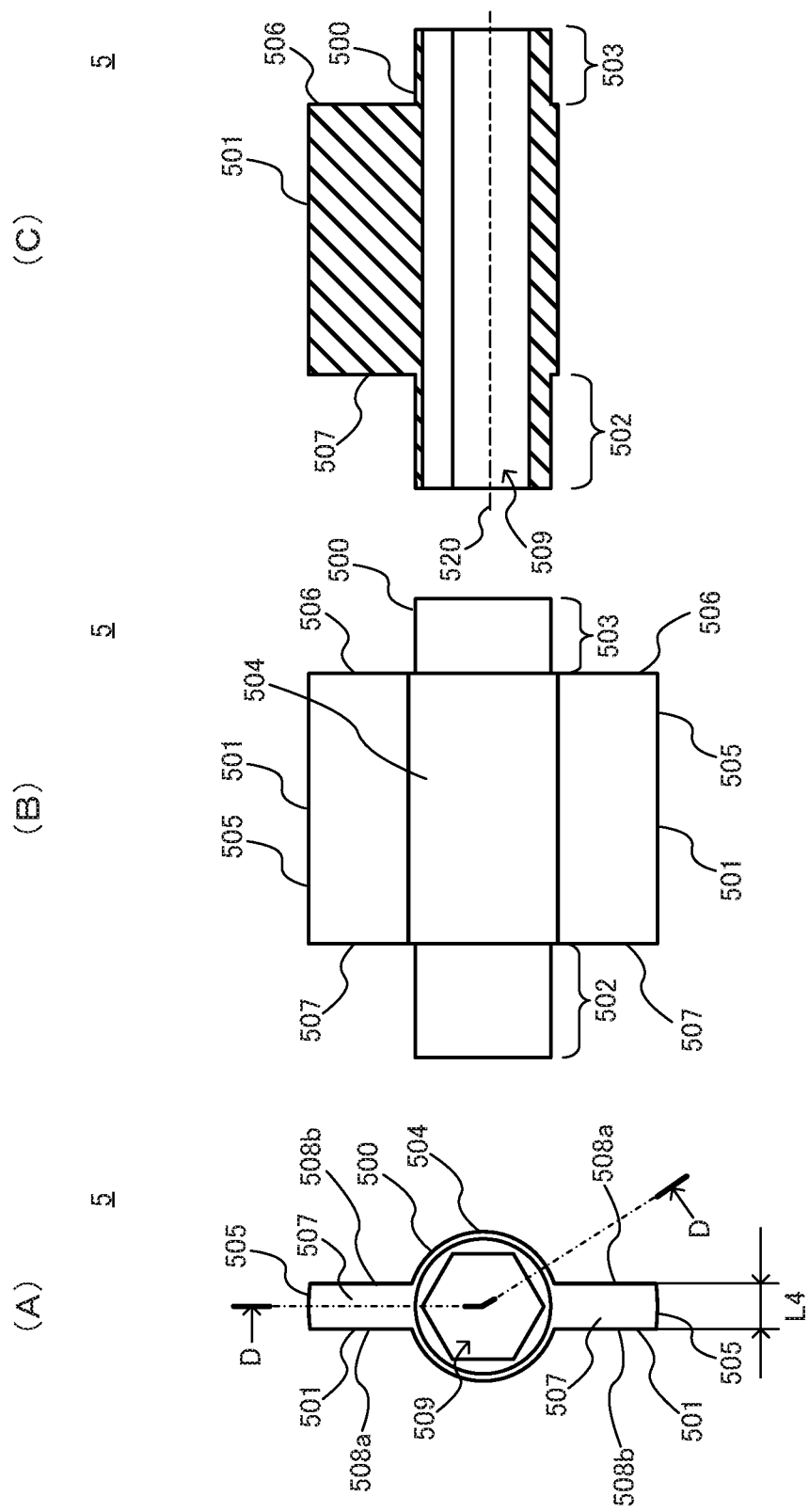
FIG. 6(A) and FIG. 6(B) are respectively a front view and a side view, of a rotor 5.
FIG. 6(C) is a D-D cross sectional view of the rotor 5 illustrated in FIG. 6(A).

The partitions 3 each are a member in a shape of substantial open fan an outer peripheral surface 300 of which is brought into contact with the inner peripheral surface 203 of the circular cylindrical chamber 200 of the casing 2 and an inner peripheral surface 301 of which is brought into proximity to an outer peripheral surface 504 (See FIG. 6) of a described-below rotor body 500 of the rotor 5 contained in the circular cylindrical chamber 200 of the casing 2. The pair of the partitions 3, along the center line 220 of the circular cylindrical chamber 200 of the casing 2 and axisymmetrically with respect to this center axis 220, is arranged with the inner peripheral surface 301 of each partition 3 facing inward in a radial direction of the circular cylindrical chamber 200, thus partitioning an inside of the circular cylindrical chamber 200 into two areas 216a, 216b (See FIG. 9 and FIG. 10).

Figure 4:
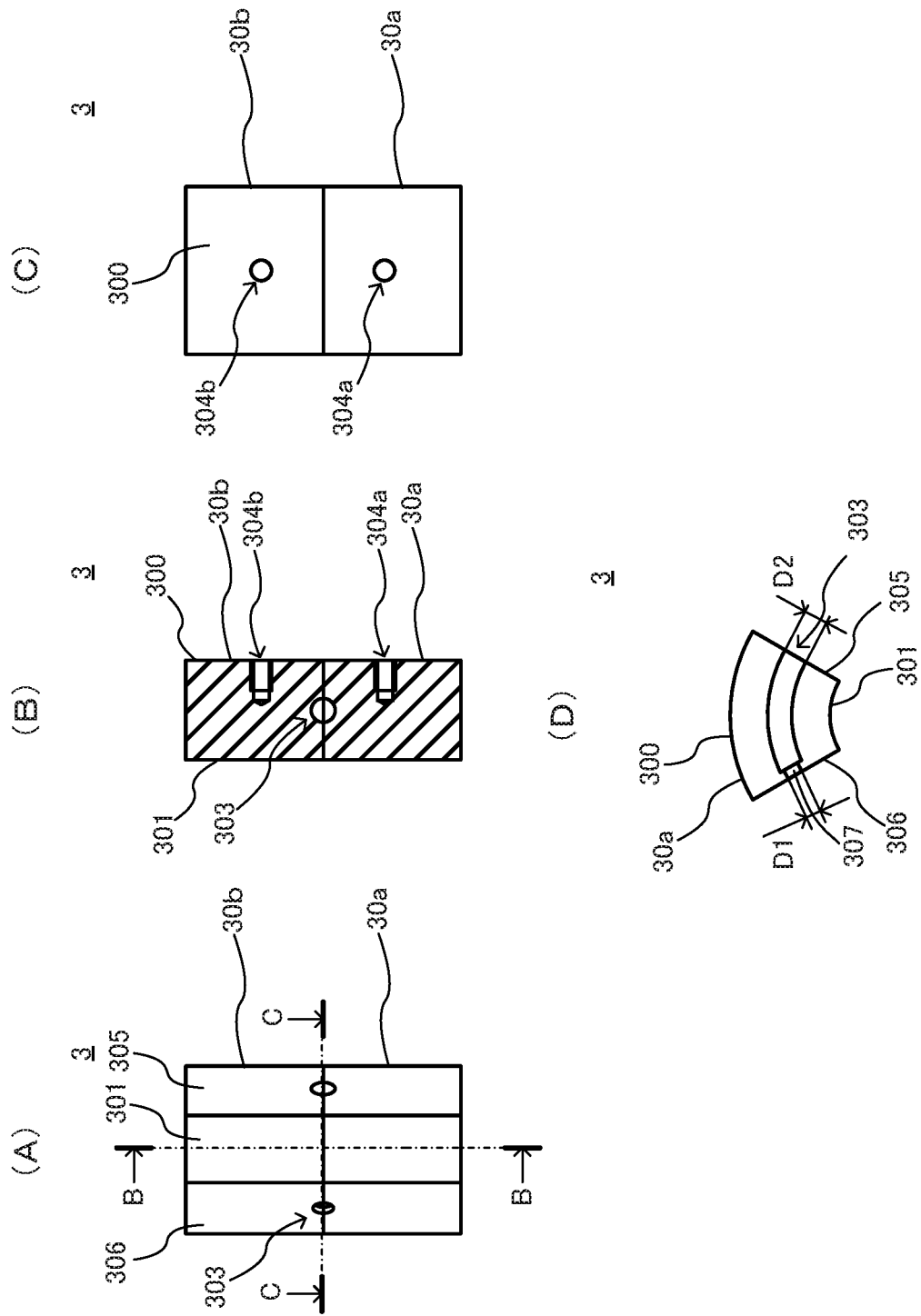
FIG. 4(A) is a front view of a partition 3.
FIG. 4(B) is a B-B cross sectional view of the partition 3 illustrated in FIG. 4(A)
FIG. 4(C) is a back view of the partition 3.
FIG. 4(D) is a C-C cross sectional view of the partition 3 (a top view of a partition block 30a) illustrated in FIG. 4(A).

FIG. 4(A) is a front view of the partition 3, FIG. 4(B) is a B-B cross sectional view of the partition 3 illustrated in FIG. 4(A), FIG. 4(C) is a back view of the partition 3, and FIG. 4(D) is a C-C cross sectional view of the partition 3 (a top view of a partition block 30a) illustrated in FIG. 4(A).

As illustrated in the figures, each two partition blocks 30a, 30b are stacked one on top of another along the center line 220 of the circular cylindrical chamber 200 of the casing 2, thereby forming the partition 3. Bolt holes 304a, 304b for screwing the respective fixation bolts 90 thereinto are formed on the outer peripheral surfaces 300 of the partition blocks 30a, 30b.

Figure 9:
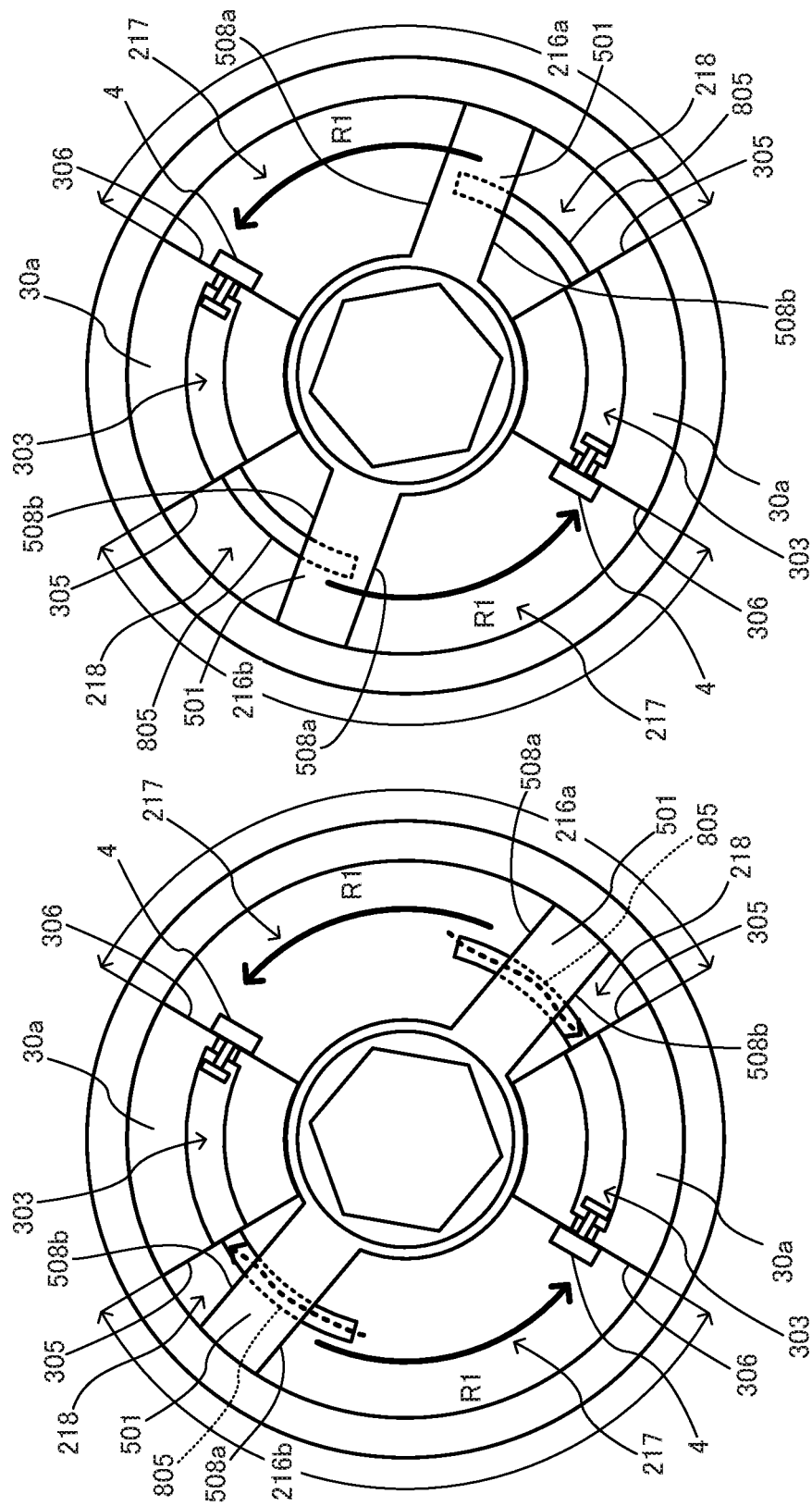
FIG. 9(A) and FIG. 9(B) are explanatory diagrams of an operating principle on the occurrence of rotation of the rotor 5 in a first rotational direction R1 relative to the casing 2.
Figure 10:
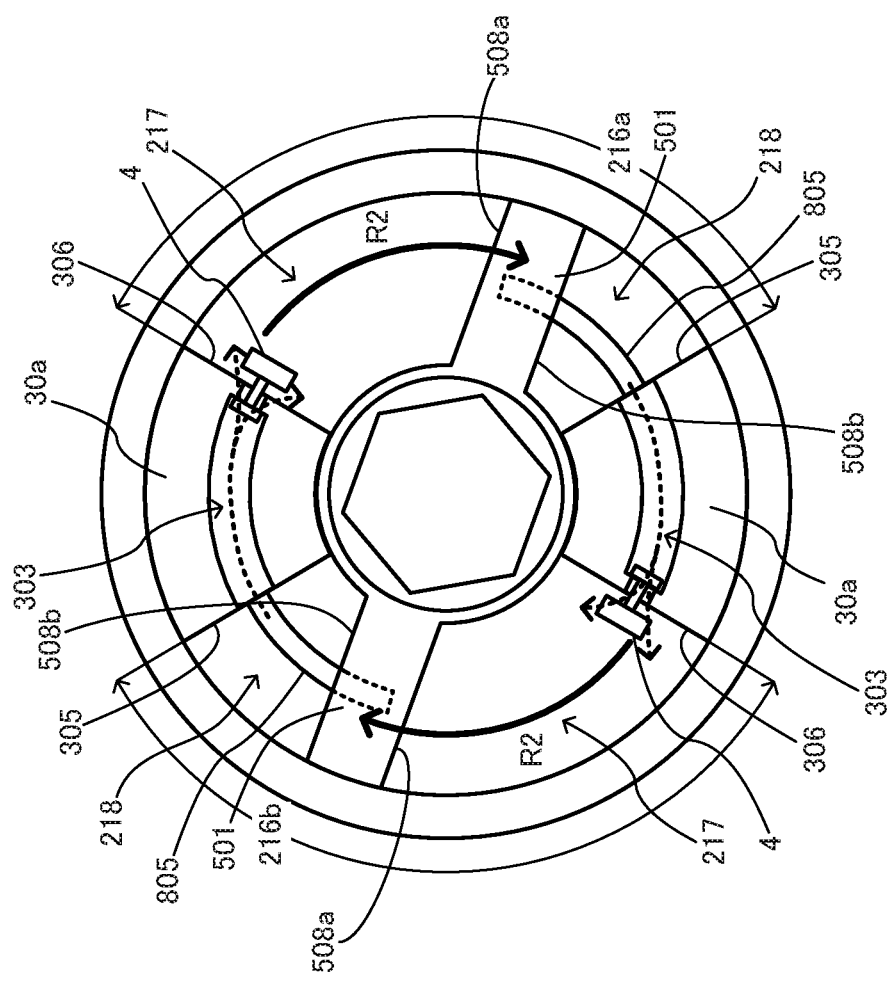
FIG. 10 is an explanatory diagram of an operating principle on the occurrence of rotation of the rotor 5 in a second rotational direction R2 relative to the casing 2.

A flow path 303 is formed on each of the partitions 3 and passing through both of circumferential end-faces 305, 306 to communicate between the areas 216a, 216b into which the partitions 3 partitions the circular cylindrical chamber 200 of the casing 2 (See FIG. 9 and FIG. 10). A stopper 307 for preventing drop of the check valves 4 is formed on the upstream side of each flow path 303 (i.e. on the end face 306 side of the partition 3) against a first rotational direction R1 (See FIG. 9 and FIG. 10).

The partition blocks 30a, 30b are stacked one on top of another such as a groove formed on an upper surface of the partition block 30a faces a groove formed on a lower surface of the partition block 30b, thus forming the flow path 303.

For example, each partition 3 having the above structure is contained in the circular cylindrical chamber 200 of the casing 2 in the following manner, with the check valves 4 attached thereto. First, the partition block 30a is put on the bottom part 201 of the circular cylindrical chamber 200 of the casing 2. Then, the fixation bolt 90 is, through the insertion hole 208a of the casing 2, screwed into the bolt hole 304a formed on the outer peripheral surface 300 of the partition block 30a, thus fixating the partition block 30a to the circular cylindrical chamber 200 of the casing 2. After then, the check valve 4 is placed on the end face 306 side of the partition 3 while being engaged with the stopper 307 of the flow path 303.

Next, the partition block 30b is put on the partition block 30a placed in the circular cylindrical chamber 200 of the casing 2. Then, the fixation bolt 90 is, through the insertion hole 208b of the casing 2, screwed into the bolt hole 304b formed on the outer peripheral surface 300 of the partition block 30b, thus fixating the partition block 30b to the circular cylindrical chamber 200 of the casing 2. In the manner as described above, the partition 3 provided with the check valve 4 is brought into placement in the circular cylindrical chamber 200.

Each of the check valves 4 opens and closes the flow path 303 in end face 306 side of the corresponding partition 3.

Figure 5:
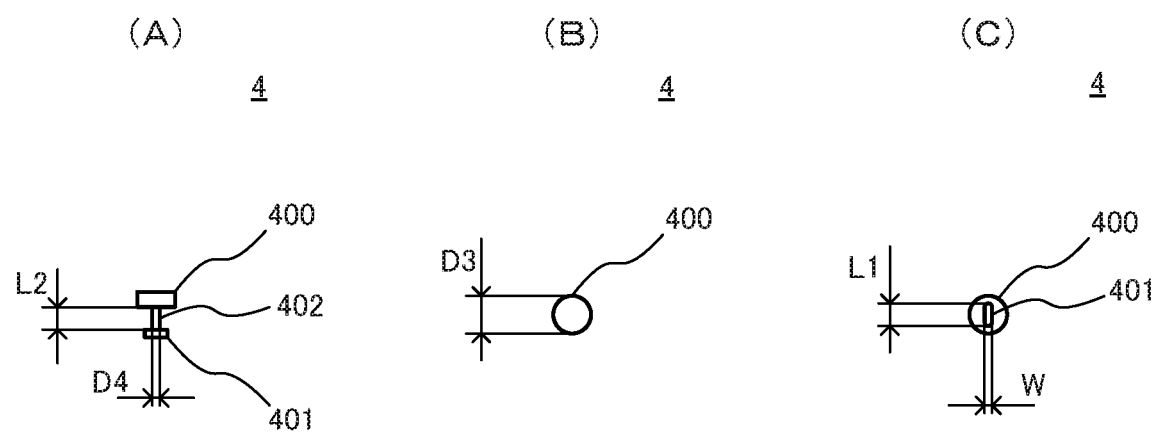
FIG. 5(A) to FIG. 5(C) are respectively a front view, a top view, and a bottom view, of a check valve 4.

FIG. 5(A)-FIG. 5(C) are respectively a front view, top view, and a bottom view, of the check valves 4.

As illustrated in the figures, the check valves 4 each include a valving part 400 in a disk shape, an interlocking part 401, and a joint part 402 in a substantial cylindrical shape jointing the valving part 400 and the interlocking part 401.

The valving part 400 has a diameter D3 larger than a diameter D1 (See FIG. 4(D)) of an opening of the flow path 303 (an opening of the flow path 303, upstream side against the first rotational direction R1) on the end face 306 of the corresponding partition 3, and movement of the check valve 4 allows the opening of the flow path 303 on the end face 306 of the corresponding partition 3 to open and close.

The interlocking part 401 is a plate-like member having a length L1 longer than the diameter D1 of the opening of the flow path 303 on the end face 306 of the corresponding partition 3 and shorter than a diameter D2 of the flow path 303, and having a width W narrower than the diameter D1 of the opening of the flow path 303 on the end face 306 of the corresponding partition 3. When the valving part 400 moves in a direction of opening the opening of the flow path 303 on the end face 306 of the corresponding partition 3, the interlocking part 401 engages with the stopper 307 of the flow path 303 to prevent drop of the check valve 4 from the flow path 303.

The joint part 402 is a cylindrical member having a diameter D4 smaller than the diameter D1 of the opening of the flow path 303 on the end face 306 of the corresponding partition 3. A length L2 of the joint part 402 of the check valve 4 is set long enough for the valving part 400 to open the flow path 303 while the interlocking part 401 engages with the stopper 307 of the flow path 303 and short such that the interlocking part 401 is allowed to move freely without contact with a side wall of the flow path 303 while the valving part 400 closes the flow path 303.

The check valve 4 having the above structure is attached so as to position the valving part 400 outside on the end face 306 side of the corresponding partitions 3 and so as to position the interlocking part 401 behind the stopper 307 within the flow path 303.

The rotor 5 is to be contained in the circular cylindrical chamber 200 so as to become rotatable relative to the circular cylindrical chamber 200 of the casing 2.

FIG. 6(A) and FIG. 6(B) are respectively a front view and a side view, of the rotor 5, and FIG. 6(C) is a D-D cross sectional view of the rotor 5 illustrated in FIG. 6(A).

As illustrated in the figures, the rotor 5 includes a rotor body 500 in substantial cylindrical shape, and a pair of vanes (rotating blades) 501 formed axisymmetrically with respect to a rotating axis 520 of the rotor body 500.

The vanes 501 are formed along the rotating axis 520 of the rotor 5 so as to project radially outward from the outer peripheral surface 504 of the rotor body 500, and place respective front end faces 505 close to the inner peripheral surface 203 of the circular cylindrical chamber 200 of the casing 2 to partition the circular cylindrical chamber 200. A sliding member 508 is attached to each vane 501 as necessary and acts as a sealing member for filling gaps between the front end face 505 of the corresponding vane 501 and the inner peripheral surface 203 of the circular cylindrical chamber 200, between an upper surface 507 of the corresponding vane 501 and a lower surface 704 of the lid 7 (See FIG. 7), and between an lower surface 506 of the corresponding vane 501 and an upper surface 803 (See FIG. 8) of the torque regulation plate 8 (See FIG. 1 and FIG. 2). Resin excellent in sliding properties, such as polyamide resin, is used as a material of the sliding members 508.

A through hole 509 for insertion of a hexagonal shaft (not illustrated) for transmitting an external rotating-force to the rotor 5 is formed on the rotor body 500, with the rotating axis 520 as a center. An upper end part 502 of the rotor body 500 is to be rotatably inserted into an opening section 700 (See FIG. 7) of the lid 7, and a lower end part 503 of the rotor body 500 is to be rotatably inserted into an opening section 800 (See FIG. 8) of the torque regulation plate 8 placed on the bottom part 201 of the circular cylindrical chamber 200 of the casing 2(See FIG. 2). A sealing member (not illustrated), such as O-ring, may be interposed between the lower end part 503 of the rotor body 500 and the opening section 800 of the torque regulation plate 8 so that no external-leakage of the viscous fluid 6 occurs through the opening section 800 of the torque regulation plate 8.

The lid 7 seals the pair of the partitions 3 each having the check valve 4 attached thereto, the rotor 5, and the torque regulation plate 8 along with the viscous fluid 6, in the casing 2.

FIG. 7(A) to FIG. 7(C) are respectively a front view, a side view, and a back view, of the lid 7, and FIG. 7(D) is an E-E cross sectional view of the lid 7 illustrated in FIG. 7(A)

As illustrated in the figures, the lid 7 includes the opening section 700 formed to pass through an upper surface 703 and the lower surface 704 of the lid 7, at a position facing the opening part 202 formed on the bottom part 201 of the circular cylindrical chamber 200 of the casing 2. The upper end part 502 of the rotor body 500 of the rotor 5 is inserted into this opening section 700. An external threaded section 702 is formed on an outer peripheral surface 701 of the lid 7 to be screwed into the internal threaded section 207 formed on the opening side 206 of the inner peripheral surface 203 of the circular cylindrical chamber 200 of the casing 2. A sealing member(not illustrated), such as O-ring, may be interposed between the upper end part 502 of the rotor body 500 of the rotor 5 and the opening section 700 of the lid 7 so that no external-leakage of the viscous fluid 6 occurs through the opening section 700 of the lid 7. Similarly, a sealing member (not illustrated), such as O-ring, may be interposed between the outer peripheral surface 701 of the lid 7 and the inner peripheral surface 203 of the circular cylindrical chamber 200 of the casing 2 so that no external-leakage of the viscous fluid 6 occurs through a screw-meshing part between the external threaded section 702 of the lid 7 and the internal threaded section 207 of the circular cylindrical chamber 200 of the casing 2.

The torque regulation plate 8 is placed on the bottom part 201 of the circular cylindrical chamber 200 of the casing 2 to fill a gap between the bottom part 201 of the circular cylindrical chamber 200 and the vanes 501 of the rotor 5.

FIG. 8(A) to FIG. 8(C) are respectively a front view, a side view, and a back view, of the torque regulation plate 8, and FIG. 8(D) is an F-F cross sectional view of the torque regulation plate 8 illustrated in FIG. 8(A).

As illustrated in the figures, the torque regulation plate 8 includes the followings: a torque regulation plate body 801 in a substantial disk shape, having at center the opening section 800 for insertion of the lower end part 503 of the rotor body 500 of the rotor 5; and the operation part 802 in a substantial hollow cylindrical shape connecting to the opening section 800 on a lower surface (i.e. a surface facing the bottom part 201 of the circular cylindrical chamber 200 of the casing 2) 804 of the torque regulation plate body 801.

The torque regulation plate body 801 has an outer diameter slightly smaller than an inner diameter of the circular cylindrical chamber 200 of the casing 2; and on its upper surface 803, a pair of bypass passages 805, each in a substantial groove shape having a length L3 in a circumferential direction longer than a vane 501 thickness L4 in a rotational direction of the rotor 5, is formed so that the bypass passages 805 are arranged axisymmetrically with respect to the center line 830 of the torque regulation plate 8.

Figure 2:
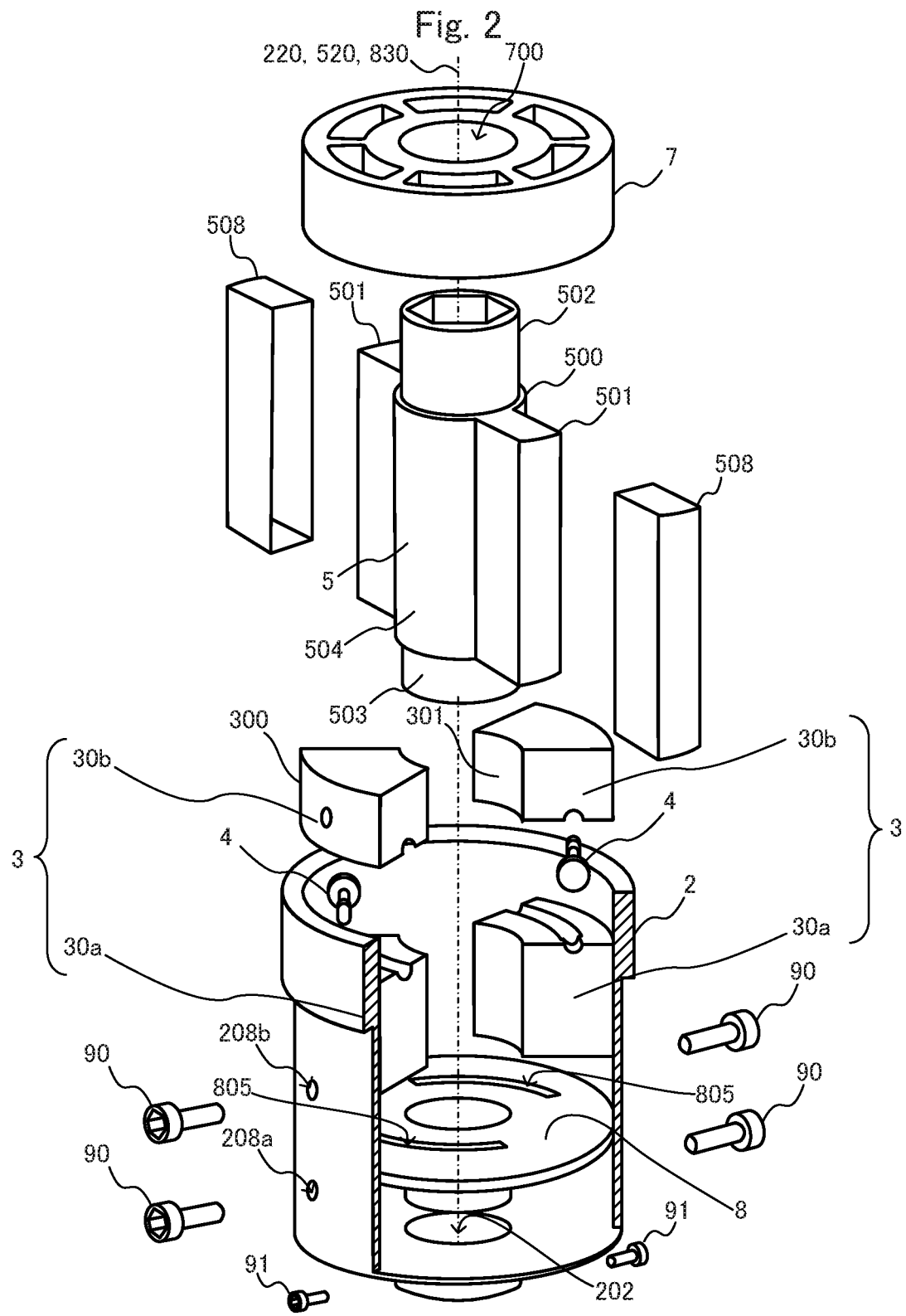
FIG. 2 is an illustrated parts breakdown of the rotary damper 1 according to the embodiment of the present invention.

The operation part 802 has a length L5 longer than a length L6 of the opening part 202 of the casing 2 and is inserted into the opening part 202 of the casing 2, so that its top part 806 become exposed by the opening part 202 of the casing 2 (See FIG. 1). Operator can turn the torque regulation plate body 801 relative to the casing 2 by operation of this exposed top part 806, and thereby arrange the bypass passage 805 at any position. Then, the limit screws 91 are screwed into the respective threaded holes 204 of the opening part 202 of the casing 2 to force the tips of the limit screws 91 against the operation part 802, and this results in limiting rotation of the torque regulation plate body 801 relative to the casing 2, thereby allowing for fixing each bypass passage 805 at any position.

Secondary, operating principles of the rotary damper 1 will be described.

FIG. 9(A) and FIG. 9(B) are explanatory diagrams of an operating principle on the occurrence of rotation of the rotor 5 in the first rotational direction R1 relative to the casing 2.

FIG. 10 is an explanatory diagram of an operating principle on the occurrence of rotation of the rotor 5 in a second rotational direction R2 relative to the casing 2.

As illustrated in FIG. 9(A) and FIG. 9(B), when the rotor 5 is first rotated in the first rotational direction R1 relative to the casing 2, areas 217 between the vanes 501 of the rotor 5 and the end faces 306 on the upstream side of the respective partitions 3 with respect to the first rotational direction R1, become compressed.

As a result, the check valves 4 close the respective flow paths 303 under pressure on the viscous fluid 6 in the areas 217, therefore causing no movement of the viscous fluid 6 through the respective flow paths 303 from the areas 217 into areas 218 between the vanes 501 of the rotor 5 and the end face 305 on downstream side of the partitions 3 with respect to the first rotational direction R1. As illustrated in FIG. 9(A), when faces 508a, 508b at both ends of each vane 501 in the rotational direction of the rotor 5, however, are located in circumferential range of the corresponding bypass passage 805, each area 217 and the corresponding area 218 communicate through the corresponding bypass passage 805 and movement from the area 217 to the area 218 is caused though this bypass passage 805. Consequently, pressure on the viscous fluid 6 in the area 217 doesn't rise so high and therefore generates a small damping torque in relation to rotating force in the first rotational direction R1 of this rotor 5.

When the rotor 5 then rotates further in the first rotational direction R1 relative to the casing 2 to locate at least one of the faces 508a, 508b at both ends of each vane 501 in the rotational direction of the rotor 5 outside the circumferential range of the corresponding bypass passage 805 as illustrated in FIG. 9(B), communication between each area 217 and the corresponding area 218 through the corresponding bypass passage 805 gets closed off, and therefore no movement of the viscous fluid 6 from each area 217 to the corresponding area 218 is caused through the corresponding bypass passage 805. This allows movement of the viscous fluid 6 only through a gap between the inner peripheral surface 301 of each partition 3 and the outer peripheral surface 504 of the rotor body 500 of the rotor 5, through the gap between the upper surface 803 of the torque regulation plate 8 and the lower surface 506 of each vane 501 of the rotor 5, and through the gap between the lower surface 704 of the lid 7 and the upper surface 507 of each vane 501 of the rotor 5, resulting in increase of pressure on the viscous fluid 6 in each area 217. Consequently, a large damping torque generates in relation to a rotating force in the first rotational direction R1 of this rotor 5.

As illustrated in FIG. 10, when the rotor 5 rotates in a second rotational direction R2, namely in the direction opposite to the first rotational direction R1, relative to the casing 2, conversely, each area 218 between the corresponding vane 501 of the rotor 5 and the end face 305 on upstream side of the corresponding partition 3 with respect to the second rotational direction R2, is compressed.

As a result, the viscous fluid 6 in these area 218 flows into the respective flow paths 303. Force applied by the viscous fluid 6 flowing into these flow path 303 causes the check valves 4 to open the respective flow path 303, and the viscous fluid 6 flowing from the areas 218 into the respective flow path 303 discharges into the respective area 217. Consequently, pressure on the viscous fluid 6 in the areas 218 doesn't rise so high, and therefore generates a small damping torque in relation to a rotating force in the second rotational direction R2 of this rotor 5.

Hereinabove, one embodiment of the present invention has been described.

In the present embodiment, the torque regulation plate 8 is placed on the bottom part 201 of the circular cylindrical chamber 200 of the casing 2 to fill the gap between the bottom part 201 of the circular cylindrical chamber 200 and the vanes 501 of the rotor 5, and the bypass passages 805, each in a substantial groove shape having the length L3 larger in circumferential direction than the vane 501 thickness L4 in the rotational direction of the rotor 5, are formed on the upper surface 803 of the torque regulation plate body 801 of this torque regulation plate 8. When the rotor 5 rotates in the first rotational direction R1 relative to the casing 2 and the faces 508a, 508b at both ends of each vane 501 in the rotational direction of the rotor 5 are located inside the range of the corresponding bypass passage 805, the areas 218 upstream and the areas 217 downstream from the vanes 501 against the first rotational direction of the rotor 5 are communicated to each other through the respective bypass passage 805, and the viscous fluid 6 becomes movable from the areas 217 to the respective areas 218 through the respective bypass passages 805. This results in occurring no large damping torque in relation to the rotating force on the rotor 5 in the first rotational direction R1.

When the rotor 5 then rotates further in the first rotational direction R1 relative to the casing 2 to locate at least one of the faces 508a, 508b at both ends of each vane 501 in the rotational direction of the rotor 5 outside the range of the bypass passage 805, the bypass passage provides no communication between the area 218 upstream and the area 217 downstream from the corresponding vane 501 against the first rotational direction R1 of the rotor 5, and therefore this results in the viscous fluid 6 immovable from the area 217 to the area 218 through the bypass passage 805. Accordingly, a large damping torque generates in relation to a rotating force on the rotor 5 in the first rotational direction R1.

Consequently, according to the present embodiment, change of lengths and arrangement positions of the grooves forming each bypass passage 805 allows for optional setting a timing for generation of a large damping torque in relation to a rotating force on the rotor 5.

In the present embodiment, the torque regulation plate 8 is provided with the operation part 802 having the length L5 longer than the length L6 of the opening part 202 of the casing 2 and being inserted into the opening part 202 of the casing 2 to expose its top part 806 out of the opening part 202 of the casing 2. Therefore, operator can turn the torque regulation plate body 801 relative to the casing 2 by operating this exposed top part 806, and thereby arrange each bypass passage 805 at any position. Then, the limit screws 91 are screwing into the respective threaded holes 204 of the opening part 202 of the casing 2 to force the tips of the limit screws 91 against the operation part 802, and this results in limiting rotation of the torque regulation plate body 801 relative to the casing 2, thereby allowing for fixing each bypass passage 805 at any position.

In the present embodiment, each sliding member 508 is attached to the corresponding vane 501 of the rotor 5 so that the sliding member 508 can act as the sealing member for filling between the front end face 505 of the vane 501 and the inner peripheral surface 203 of the circular cylindrical chamber 200, between the lower surface 506 of the vane 501 and the bottom part 201 of the circular cylindrical chamber 200, and between the upper surface 507 of the vane 501 and the lower surface 704 of the lid 7, thereby closing the gaps therebetween whereas achieving improvement of sliding properties. This results in achieving a larger damping torque in relation to a rotating force on the rotor 5 and in allowing for smooth rotation of the hexagonal shaft for transmitting an external rotating-force to the rotor 5.

The present invention can include, but is not limited to, the above embodiment: it will be obvious to those skilled in the art that various changes may be made without departing from the scope of the invention.

For example, the present invention can include, but is not limited to, the above embodiment in which placement of the torque regulation plate 8 on the bottom part 201 of the circular cylindrical chamber 200 of the casing 2 forms the bypass passages 805 on the bottom part 201 side of the circular cylindrical chamber 200. The bypass passages may be formed on the lower surface 704 side of the lid 7 or be formed on the inner peripheral surface 203 side of the circular cylindrical chamber 200.

Figure 11:
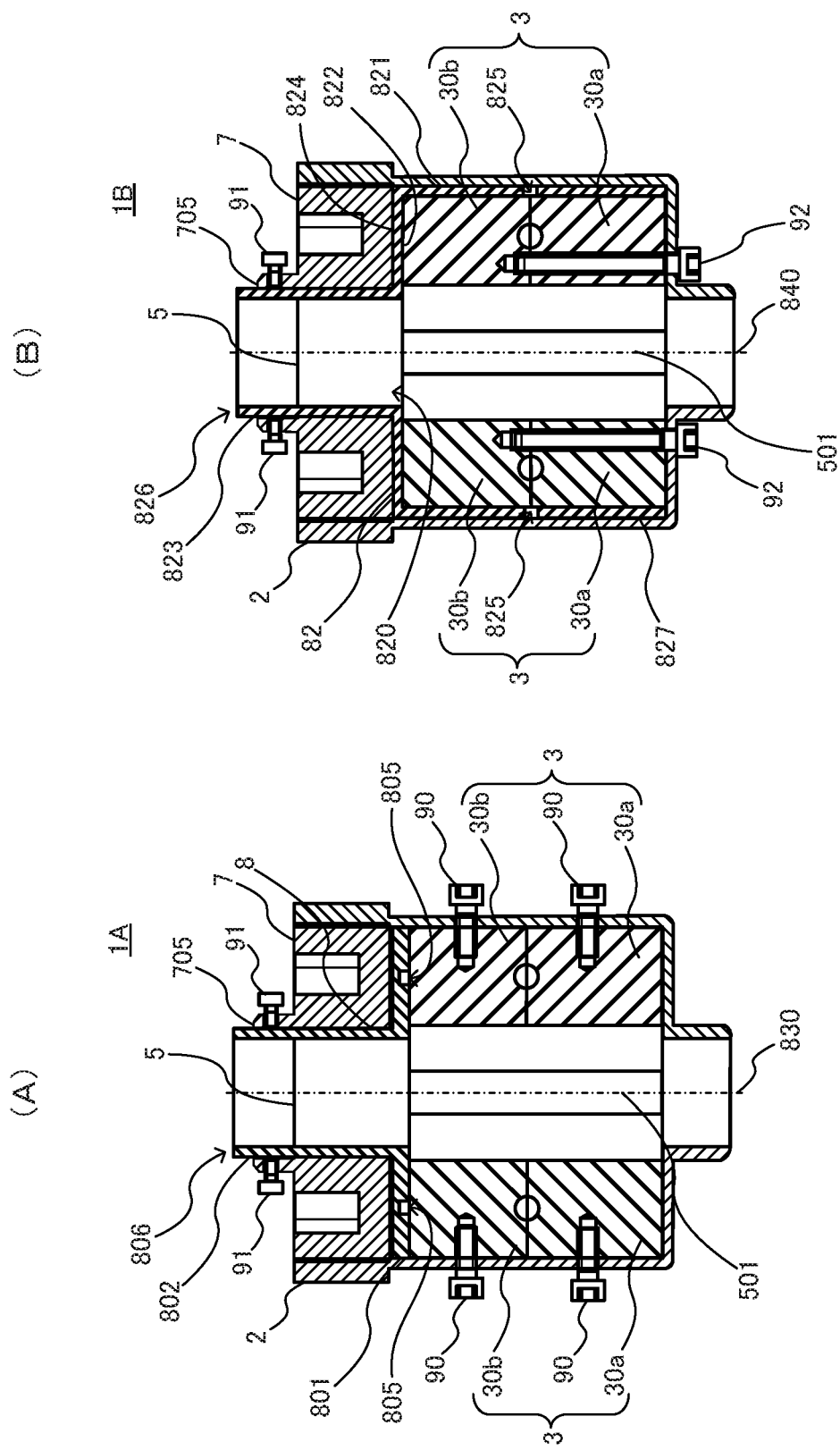
FIG. 11(A) is a schematic cross-sectional view of a first modification 1A of the rotary damper 1 according to the embodiment of the present invention.
FIG. 11(B) is a schematic cross-sectional view of a second modification 1B of the rotary damper 1 according to the embodiment of the present invention.

FIG. 11(A) is a schematic cross-sectional view of a first modification 1A of the rotary damper 1 according to one embodiment of the present invention.

The rotary damper 1A illustrated in FIG. 11(A) differs from the rotary damper 1 according to the embodiment of the present invention in the following respects: the torque regulation plate 8, with the operation part 802 inserted in the opening section 700 of the lid 7 and with the surface of the torque regulation plate body 801 where the bypass passages 805 are formed toward the circular cylindrical chamber 200, is placed onto the lower surface 704 of the lid 7 to fill in the gap between the lower surface 704 of the lid 7 and the vanes 501 of the rotor 5; an annular protrusion 705 shorter in a total length including a thickness of the lid 7 than the length of the operation part 802 of the torque regulation plate 8 is formed on the upper surface 703 of the lid 7 to surround the opening section 700, and the top part 806 of the operation part 802 of the torque regulation plate 8 is exposed out of the annular protrusion 705; and a pair of threaded holes for screwing the limit screws 91 is formed in this annular protrusion 705. Other components are similar to those of the rotary damper 1 according to the embodiment of the present invention.

Also for the present embodiment, operator can turn the torque regulation plate body 801 relative to the casing 2 by operating the top part 806 of the operation part 802 of the torque regulation plate 8 exposed out of the annular protrusion 705 formed on the upper surface 703 of the lid 7, thereby placing each bypass passage 805 at any position. The limit screws 91 are screwed into the respective threaded holes of this annular protrusion 705 to force tips of the limit screws 91 against the operation part 802, and this results in limiting rotation of the torque regulation plate body 801 relative to the casing 2, thereby allowing for fixing each bypass passage 805 at any position. Other advantages are similar to those of the rotary damper 1 according to the embodiment of the present invention.

FIG. 11(B) is a schematic cross-sectional view of a second modification 1B of the rotary damper 1 according to one embodiment of the present invention The rotary damper 1B illustrated in FIG. 11(B) differs from the rotary damper 1 according to the embodiment of the present invention in the following respects: the partitions 3, with the check valves 4 attached, are contained in the circular cylindrical chamber 200 so as to form gaps between the outer peripheral surface 300 of the partitions 3 and the inner peripheral surface 203 of the circular cylindrical chamber 200 of the casing 2 in a manner such that the partition block 30a, 30b are stacked one on top of another on the bottom part 201 of the circular cylindrical chamber 200 and are fixed by fixation bolts 92 through respective through holes located on the bottom part 201 of the circular cylindrical chamber 200; a torque regulation cylinder 82 is provided instead of the torque regulation plate 8; the annular protrusion 705 is formed on the upper surface 703 of the lid 7 to surround the opening section 700; and a pair of threaded holes for screwing the limit screws 91 is formed in this annular protrusion 705. Other components are similar to those of the rotary damper 1 according to the embodiment of the present invention.

The torque regulation cylinder 82 includes the follows: a torque regulation cylinder body 821 having a lower end opened and upper end on which an end face 822 is formed to include an opening section 820 to insert the upper end part 502 of the rotor body 500 of the rotor 5 into; and an operation part 823 in a substantial hollow cylindrical shape connected to the opening section 820 on a face 824 opposite to the end face 822 of the torque regulation cylinder body 821.

The torque regulation cylinder body 821 has an outer diameter slightly smaller than the inner diameter of the circular cylindrical chamber 200 of the casing 2 and an inner diameter slightly larger than a diameter of a circle including the outer peripheral surfaces 300 of the partitions 3 and the front end faces 505 of the vanes 501 of the rotor, and is attached to the circular cylindrical chamber 200 so as to fill individual gap between the inner peripheral surface 203 of the circular cylindrical chamber 200 and the outer peripheral surface 300 of each partition 3 or the front end face 505 of each vane 501. On a side surface 827 of the torque regulation cylinder body 821 is formed a pair of slit-like bypass passages 825 larger in circumferential length than the vane 501 thickness L4 in the rotational direction of the rotor 5 so as to be axisymmetrically arranged with respect to a center line 840 of the torque regulation cylinder 82.

The operation part 823 is larger in length than total of a thickness of the lid 7 and a length of the annular protrusion 705, and is inserted into the opening section 700 of the lid 7 to expose its top part 826 out of the annular protrusion 705 of the lid 7.

Also for the present embodiment, operator can turn the torque regulation cylinder body 821 relative to the casing 2 by operating the top part 826 of the operation part 823 of the torque regulation cylinder 82, exposed out of the annular protrusion 705 formed on the upper surface 703 of the lid 7, and thereby arrange each bypass passage 825 at any position. Then, the limit screws 91 are screwed into the respective threaded holes of this annular protrusion 705 to force tips of the limit screws 91 against the operation part 823, and this results in limiting rotation of the torque regulation cylinder body 821 relative to the casing 2, thereby allowing for fixing each bypass passage 805 at any position. Other advantages are similar to those of the rotary damper 1 according to the embodiment of the present invention.

The present invention can includes, but not limited to, the above embodiment in which the limit screws 91 limit rotation of the torque regulation plate 8 relative to the casing 2. After turn of the torque regulation plate 8 relative to the casing 2 has arranged each bypass passage 805 at any position, other manner, such as adhesive, may fixate the torque regulation plate 8 to the casing 2, thereby limiting rotation of the torque regulation plate 8 relative to the casing 2.

The above embodiment has been described, including the example in which each bypass passage 805 is formed using the torque regulation plate 8; however, the present invention is not limited to this example. A pair of the bypass passages, each in a substantial groove shape being longer in circumferential length than the vane 501 thickness L4 in the rotational direction of the rotor 5, may be directly formed on at least one of the followings: the bottom part 201, the inner peripheral surface 203, of the circular cylindrical chamber 200 of the casing 2, and the lower surface 704 of the lid 7.

The above embodiment has been described, including the example in which each flow path 303 is formed on the corresponding partition 3; however, the present invention is not limited to this example. A flow path may be formed on the vane 501 of the rotor 5 so as to communicate between the area 217 and the area 218.

The above embodiment has been described, including the example in which the circular cylindrical chamber 200 of the casing 2 is provided with the pair of the partitions 3 and the rotor 3 is provided with the pair of the vanes 501; however, the present invention is not limited to this example. As far as the partition(s) 3 and the vane(s) 501 are the same in number, the number of the partition(s) 3 and the number of the vane(s) 501, to be formed, each may be one, or three or more. In this case, the number of the bypass passage(s) 805 to be formed is the same as these.

The above embodiments each have been described with, as an example, the so-called uni-directional rotary damper that is capable of generating a large damping torque during relative rotation of the rotor 5 to the casing 2 in the first rotational direction R1 and of generating a small damping torque during relative rotation in the second rotational direction R2, namely in the direction opposite to the first rotational direction R1. However, the present invention may also be applied to a so-called bi-directional rotary damper capable of generating a large damping torque during relative rotation of the rotor 5 to the casing 2 in any of the first rotational direction R1 and the second rotational direction R2.

The rotary damper according to the present invention is widely applicable to seats with reclining function as used in, for example, automobiles, railroad vehicles, aircrafts, and vessels.

REFERENCE SIGNS LIST 1, 1A, 1B: rotary damper, 2: casing, 3: partitions, 4: check valve, 5: rotor, 6 : viscous fluid, 7: lid, 8: torque regulation plate, 30a, 30b: partition block, 82: torque regulation cylinder, 200: circular cylindrical chamber, 201: bottom part of the circular cylindrical chamber 200, 202: opening part of the circular cylindrical chamber 200, 203: inner peripheral surface of the circular cylindrical chamber, 200, 204: threaded hole, 205: outer peripheral surface of the circular cylindrical chamber 200, 206: opening side of the circular cylindrical chamber 200, 207: internal threaded section of the circular cylindrical chamber 200, 208a, 208b: insertion hole, 209: inner peripheral surface of the opening part 202, 210: outer peripheral surface of the opening part 202, 211: installation part, 220: center line of the circular cylindrical chamber 200, 300: outer peripheral surface of the partition 3, 301: inner peripheral surface of the partition 3, 303: flow path, 304a, 304b: bolt hole, 305, 306: end face of the partition 3, 307: stopper, 400: valving part, 401: interlocking part, 402: joint part, 500: rotor body, 501: vane, 502: upper end part of the rotor body 500, 503: lower end part of the rotor body 500, 504: outer peripheral surface of the rotor body 500, 505: front end face of the vane 501, 506: lower surface of the vane 501, 507: upper surface of the vane 501, 508: sealing member, 509: through hole on the rotor body 500, 520: rotating axis of the rotor 5, 700: opening section of the lid 7, 701: outer peripheral surface of the lid 7, 702: external threaded section of the lid 7, 703: upper surface of the lid 7, 704: lower surface of the lid 7, 705: annular protrusion, 800: opening section of the torque regulation plate 8, 801: torque regulation plate body, 802: operation part of the torque regulation plate 8, 803: upper surface of the torque regulation plate body 801, 804 : lower surface of the torque regulation plate body 801, 805: bypass passage, 806: top part of the operation part 802, 820: opening section of the torque regulation cylinder 82, 821: torque regulation cylinder body, 822: end face of the torque regulation cylinder 82, 823: operation part of the torque regulation cylinder 82, 824: opposite face to the end face 822, of the torque regulation cylinder body 821, 825: bypass passage, 826: top part of the operation part 823, 827: side surface of the torque regulation cylinder body 821

The invention claimed is:

1. A rotary damper for limiting a movement of a viscous fluid to generate a damping torque in reaction to a rotating force applied, the rotary damper comprising:

a casing having a circular cylindrical chamber filled by the viscous fluid;

a partition in a shape of substantial open fan, placed in the circular cylindrical chamber and partitioning an inside of the circular cylindrical chamber;

a rotor configured to rotate due to the rotating force applied and comprising a rotor body and a vane, the rotor body contained in the circular cylindrical chamber rotatably relative to the circular cylindrical chamber and placing an outer peripheral surface close to an inner peripheral surface of the partition, the vane formed along a center line of the circular cylindrical chamber and radially outwardly from the outer peripheral surface of the rotor body to place a front end face close to an inner peripheral surface of the circular cylindrical chamber;

a lid attached to an opening section of the circular cylindrical chamber and sealing the rotor along with the viscous fluid within the circular cylindrical chamber; and a bypass passage having a groove longer than a thickness of the vane in a rotational direction of the rotor, the groove being located on of a bottom side of the circular cylindrical chamber;

upon faces that form both ends of the vane in the rotational direction of the rotor being located inside of a range of the bypass passage, an area upstream and an area downstream from the vane against the rotational direction of the rotor being communicated with each other through the bypass passage, out of the areas in the circular cylindrical chamber partitioned by the vane and the partition, and the viscous fluid in the area upstream and in the area downstream becoming movable through the bypass passage; and upon at least one of the faces that form the both ends of the vane in the rotational direction of the rotor being located outside of the range of the bypass passage, the bypass passage providing no communication between the area upstream and the area downstream from the vane and the viscous fluid in the area upstream and in the area downstream becoming immovable through the bypass passage.

2. A rotary damper according to claim 1, further comprising:

a disk plate placed in a bottom of the circular cylindrical chamber and filling a gap between the bottom of the circular cylindrical chamber and the vane; and the groove of the bypass passage being formed on the disk plate.

3. A rotary damper according to claim 2, wherein
the casing further comprises an insertion hole formed on the bottom of the circular cylindrical chamber, and
the disk plate comprises an operation part inserted in the insertion hole of the casing and having a top part exposed outside the casing, the disk plate configured to rotate by an operation of the operation part.

4. A rotary damper according to claim 3, further comprising:
a flow path provided in the partition and/or in the vane of the rotor and communicating between areas in the circular cylindrical chamber partitioned by the partition and the vane.

5. A rotary damper according to claim 4, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

6. A rotary damper according to claim 1, further comprising:
a flow path provided in the partition and/or in the vane of the rotor and communicating between areas in the circular cylindrical chamber partitioned by the partition and the vane.

7. A rotary damper according to claim 6, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

8. A rotary damper according to claim 2, further comprising:
a flow path provided in the partition and/or in the vane of the rotor and communicating between areas in the circular cylindrical chamber partitioned by the partition and the vane.

9. A rotary damper according to claim 8, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

10. A rotary damper for limiting a movement of a viscous fluid to generate a damping torque in reaction to a rotating force applied, the rotary damper comprising:
a casing having a circular cylindrical chamber filled by the viscous fluid;
a partition in a shape of substantial open fan, placed in the circular cylindrical chamber and partitioning an inside of the circular cylindrical chamber;
a rotor configured to rotate due to the rotating force applied and comprising a rotor body and a vane, the rotor body contained in the circular cylindrical chamber rotatably relative to the circular cylindrical chamber and placing an outer peripheral surface close to an inner peripheral surface of the partition, the vane formed along a center line of the circular cylindrical chamber and radially outwardly from the outer peripheral surface of the rotor body to place a front end face close to an inner peripheral surface of the circular cylindrical chamber;
a lid attached to an opening section of the circular cylindrical chamber and sealing the rotor along with the viscous fluid within the circular cylindrical chamber; and
a bypass passage having a groove longer than a thickness of the vane in a rotational direction of the rotor, the groove being located on a lower side of the lid;
upon faces that form both ends of the vane in the rotational direction of the rotor being located inside of a range of the bypass passage, an area upstream and an area downstream from the vane against the rotational direction of the rotor being communicated with each other through the bypass passage, out of the areas in the circular cylindrical chamber partitioned by the vane and the partition, and the viscous fluid in the area upstream and in the area downstream becoming movable through the bypass passage; and
upon at least one of the faces that form the both ends of the vane in the rotational direction of the rotor being located outside of the range of the bypass passage, the bypass passage providing no communication between the area upstream and the area downstream from the vane and the viscous fluid in the area upstream and in the area downstream becoming immovable through the bypass passage.

11. A rotary damper according to claim 10, further comprising;
a disk plate arranged on a lower surface of the lid and filling a gap between the lower surface of the lid and the vane; and
the groove of the bypass passage being formed on the disk plate.

12. A rotary damper according to claim 11, wherein
the lid further comprises an insertion hole formed on the lower surface of the lid, and
the disk plate has an operation part inserted in the insertion hole of the lid and having a top part exposed outside the lid, the disk plate configured to rotate by an operation of the operation part.

13. A rotary damper according to claim 12, further comprising:
a flow path provided in the partition and/or in the vane of the rotor and communicating between areas in the circular cylindrical chamber partitioned by the partition and the vane.

14. A rotary damper according to claim 13, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

15. A rotary damper according to claim 11, further comprising:
a flow path provided in the partition and/or in the vane of the rotor and communicating between areas in the circular cylindrical chamber partitioned by the partition and the vane.

16. A rotary damper according to claim 15, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

17. A rotary damper according to claim 10, further comprising:
a flow path provided in the partition and/or in the vane of the rotor and communicating between areas in the circular cylindrical chamber partitioned by the partition and the vane.

18. A rotary damper according to claim 17, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

19. A rotary damper for limiting a movement of a viscous fluid to generate a damping torque in reaction to a rotating force applied, the rotary damper comprising:
a casing having a circular cylindrical chamber filled by the viscous fluid;
a partition in a shape of substantial open fan, placed in the circular cylindrical chamber and partitioning an inside of the circular cylindrical chamber;
a rotor configured to rotate due to the rotating force applied and comprising a rotor body and a vane, the rotor body contained in the circular cylindrical chamber rotatably relative to the circular cylindrical chamber and placing an outer peripheral surface close to an inner peripheral surface of the partition, the vane formed along a center line of the circular cylindrical chamber and radially outwardly from the outer peripheral surface of the rotor body to place a front end face close to an inner peripheral surface of the circular cylindrical chamber;
a lid attached to an opening section of the circular cylindrical chamber and sealing the rotor along with the viscous fluid within the circular cylindrical chamber; and
a bypass passage having a groove longer than a thickness of the vane in a rotational direction of the rotor, the groove being located on an inner peripheral surface side of the circular cylindrical chamber;
upon faces that form both ends of the vane in the rotational direction of the rotor being located inside of a range of the bypass passage, an area upstream and an area downstream from the vane against the rotational direction of the rotor being communicated with each other through the bypass passage, out of the areas in the circular cylindrical chamber partitioned by the vane and the partition, and the viscous fluid in the area upstream and in the area downstream becoming movable through the bypass passage; and
upon at least one of the faces that form the both ends of the vane in the rotational direction of the rotor being located outside of the range of the bypass passage, the bypass passage providing no communication between the area upstream and the area downstream from the vane and the viscous fluid in the area upstream and in the area downstream becoming immovable through the bypass passage.

20. A rotary damper according to claim 19, further comprising:
a hollow cylinder inserted in the circular cylindrical chamber and filling gaps between the inner peripheral surface of the circular cylindrical chamber and the vane and between the inner peripheral surface of the circular cylindrical chamber and the partition; and
the groove of the bypass passage is formed on the cylinder.

21. A rotary damper according to claim 20, further comprising an insertion hole formed on a lower surface on the lid, wherein
the hollow cylinder comprises an operation part inserted in the insertion hole and having a top part exposed on an outside of the casing or the lid, and the hollow cylinder is configured to rotate by an operation of the operation part.

22. A rotary damper according to claim 21, further comprising:
a flow path provided in the partition and/or in the vane of the rotor and communicating between areas in the circular cylindrical chamber partitioned by the partition and the vane.

23. A rotary damper according to claim 20, further comprising:
a flow path provided in the partition and/or in the vane of the rotor and communicating between areas in the circular cylindrical chamber partitioned by the partition and the vane.

24. A rotary damper according to claim 23, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

25. A rotary damper according to claim 19, further comprising:
a flow path provided in the partition and/or in the vane of the rotor and communicating between areas in the circular cylindrical chamber partitioned by the partition and the vane.

26. A rotary damper according to claim 25, further comprising:
a check valve being to close the flow path upon rotating the rotor in a first rotational direction relative to the circular cylindrical chamber, and being to open the flow path upon rotating the rotor in a second rotational direction being the direction opposite to the first rotational direction relative to the circular cylindrical chamber.

* * * * *